United States Patent [19]
Humphrey et al.

[11] Patent Number: 5,722,208
[45] Date of Patent: *Mar. 3, 1998

[54] WALL MOUNTING SYSTEM FOR ELECTRICAL DEVICES

[75] Inventors: Phil A. Humphrey; Weldon C. Humphrey, both of Lydonville, N.Y.

[73] Assignee: Thermo Plastic Works, Inc., Lyndonville, N.Y.

[*] Notice: The term of this patent shall not extend beyond the expiration date of Pat. No. 5,598,670.

[21] Appl. No.: 541,897

[22] Filed: Oct. 10, 1995

Related U.S. Application Data

[63] Continuation-in-part of Ser. No. 291,398, Aug. 16, 1994.
[51] Int. Cl.⁶ .................................................. H02G 3/12
[52] U.S. Cl. ................... 52/220.8; 52/28; 52/100; 174/48; 174/53; 439/535
[58] Field of Search .................. 52/28, 173, 211, 52/212, 518, 220.8, 100; 174/53, 58, 65 R, 48, 49, 50, 66, 67, 65 G; 248/220.2, 544, 221.3, 907; 439/535; 220/3.3, 3.5, 3.8

[56] References Cited

U.S. PATENT DOCUMENTS

| | | | |
|---|---|---|---|
| D. 343,825 | 2/1994 | Enderly | D13/152 |
| 3,906,145 | 9/1975 | Carmichael | 174/61 |
| 4,327,841 | 5/1982 | Wimberly | 220/3.8 |
| 4,726,152 | 2/1988 | Vagedes et al. | 52/28 |
| 4,854,093 | 8/1989 | Kellom | 52/28 |
| 4,920,708 | 5/1990 | MacLeod et al. | 52/28 X |
| 5,000,409 | 3/1991 | MacLeod et al. | 52/28 X |
| 5,133,165 | 7/1992 | Wimberly | 52/221 |
| 5,326,060 | 7/1994 | Chubb et al. | 248/231.9 |
| 5,397,093 | 3/1995 | Chubb et al. | 52/28 X |

*Primary Examiner*—Michael Safavi
*Attorney, Agent, or Firm*—Howard M. Ellis; Marianne Fuierer

[57] ABSTRACT

An improved system for mounting electrical devices, such as lighting fixtures, switches, communication receptacles for telephones, television cables, etc., especially on exterior walls having lapped type siding or shingles comprises a one or two-piece wall mounting frame with an integrally molded electrical junction box which is flush mounted on a wall without cutting or drilling large openings to accommodate a protruding junction box, and without altering vertical supporting studs or other framing members when in alignment with such wall mounting systems. Products of the invention are molded with a narrowed gap between an interior flange and an exterior flange to allow an optimal fit with siding products while maintaining the required depth of the electrical junction box.

23 Claims, 7 Drawing Sheets

WALL MOUNTING SYSTEM FOR ELECTRICAL DEVICES

CROSS REFERENCE TO RELATED APPLICATIONS

This application is a continuation-in-part of application Ser. No. 08/291,398, filed Aug. 16, 1994.

TECHNICAL FIELD

The present invention generally relates to devices used in conjunction with the installation of electrical and communication components, and more specifically, to improved wall assemblies for wiring and mounting devices, such as lighting fixtures, electrical outlets and switches; telephone, cable and other communication equipment.

BACKGROUND OF THE INVENTION

In the process of mounting a lighting fixture or electrical receptacle, it is usual and customary for interior construction to install electrical junction boxes against ceiling joists, wall studs or other upright structures used in framing buildings. Knock-out plugs are removed from the junction boxes which are then pre-wired with electrical conductors, telephone wires, television cable, and so forth. In subsequent steps of framing, wallboards or paneling having cut-outs for the junction boxes are applied to the walls and ceilings. In the final stages, lighting fixtures, switches, receptacles, etc., are wired to the junction boxes, secured with threaded fasteners, and outer plates affixed to the exterior to provide an attractive and finished appearance.

However, the installation of lighting fixtures, electrical switches, etc., to exterior walls present difficulties not normally experienced with the foregoing interior installations. Problems are especially prevalent when mounting electrical fixtures on the exterior sides of dwellings having irregular ceder shingles, lapped type siding with inclined surfaces, and so forth. Installation of electrical fixtures to exterior lapped walls would result not only in an unsightly appearance, but did not provide a secure weather-tight seal around the fixture. Frequently, efforts to solve these problems meant cutting out siding and mounting the fixture over the opening without the required support. This also provided an unfinished appearance because cutting often meant openings were irregular or oversized.

In an effort to solve the problems associated with exterior wall installations in which lapped type siding was employed various mounting systems were developed. Representative examples of outlet trim and wall mounting devices for electrical fixtures useful with lapped siding are disclosed by MacLeod et al in U.S. Pat. No. 4,920,708 and by Wimberly in U.S. Pat. No. 5,133,165. Such wall mounting systems were generally effective in providing a weather-tight seal and overcoming appearance problems, including eliminating the need for cutting out siding.

However, such devices have not been entirely satisfactory in all respects. For example, wall mounting brackets of the type disclosed by the MacLeod et al patent in U.S. Pat. No. 4,920,708 require first cutting out a portion of the front wall for installation of an electrical junction box. The junction boxes for installation in the MacLeod et al wall mounting brackets typically come equipped with holding flanges which must be opened and tightened manually by turning a threaded fastener after inserting into the front wall orifice of the mounting assembly to secure the box to the inside surface of the wall. Installation of such junction boxes during pre-wiring is often a tedious and unreliable process because the holding flanges often fail to readily open and securely engage with the inside portion of the wall mounting assembly. Furthermore, in the case of circular electrical junction boxes used in mounting heavier lighting fixtures there is a tendency for fixtures supported by cylindrically shaped junction boxes to turn or pivot on their axes because of the inability of the holding flanges on the junction boxes to reliably engage and lock against the front plastic wall of the mounting assembly to prevent such undesirable movement.

Carmichael discloses in U.S. Pat. No. 3,906,145 a mounting system for electrical fixtures wherein the electrical junction box is fabricated as an integral component with the wall mounting bracket. While the system of Carmichael eliminates the troublesome step of installing a separate electrical junction box this one-piece structure requires boring a large opening in the side wall of the building in order to install the unit. This can present special problems particularly when the side wall interior has other vertical supporting structures such as wall studs located where the electrical junction box portion of the assembly is to be positioned.

Accordingly, there is need for an improved wall mounting assembly for wiring and securing electrical devices, such as lighting fixtures, electrical outlets, receptacles for telephones and other communication equipment, etc., particularly on exterior walls of dwellings and other buildings whereby the installation process can be greatly facilitated without requiring significant structural alterations to mounting walls.

In some instances it may be desirable to have a wall mounting assembly for electrical devices and fixtures with a reduced gap between interior and exterior flanges in order to accomodate lapped wall siding/shingles of predetermined narrowed thicknesses. While it is possible to simply fabricate such a wall mounting system of such diminished thickness, in so doing the depth of the electrical junction box will be concomitantly diminished and, of course, the interior volume of space for splicing/joining electrical wires will likewise become diminished. Such a problem can possibly result in a loss of important safety certification or result in decertification from prestigious organizations, e.g., Underwriter's Laboratories, because electrical junction boxes are required to possess minimum interior volumes of space, typically in the range of 12 cubic inches. This undesirable loss in volume can possibly be offset by expanding the width and/or length of the electrical box. However, this solution in most instances fails to compensate for the loss in needed depth as working space for more convenient wiring of the junction box, and particularly with certain types of receptacles, such as ground fault interrupters which require a full depth junction box.

Accordingly, there is need for an improved wall mounting assembly for wiring and mounting electrical devices, fixtures, etc., which can accomodate lapped siding/shingles of narrower dimension between interior and exterior flanges without trade offs in volumes of space in the electrical junction box element of the assembly, and particularly, the depth dimension of the electrical box for more convenient installation of service.

SUMMARY OF THE INVENTION

It is therefore a principal object of the invention to provide for improved wall assemblies for wiring and mounting electrical devices, particularly for exterior side walls having lapped type shingles or siding.

Structurally, the devices generally consist of a frame member having an interior flange suitable for mounting to a wall and an exterior flange member opposite the interior flange. The flanges are aligned in parallel planes and spaced from one another. This is accomplished by positioning between the two flanges an inwardly indented axial wall which provides a generally U-shaped cross-sectional channel encircling the device. In addition, there is a front wall surrounded by the exterior flange member, and an electrical box having an open end and a closed end opposite the open end. The open end of the electrical box is integral with a central opening in the front wall for access to the interior of the electrical box. The closed end of the electrical box extends rearwardly towards the interior flange but not beyond the plane of this flange.

Importantly, the electrical box and front wall are molded as an integral one-piece structural unit to avoid the tedious and time consuming task of mounting an independently fabricated junction box in a cut out opening in the front wall of the wall mounting assembly. By molding the electrical box and front wall as a one-piece integral unit possible slippage or pivoting of the box having a lighting fixture mounted thereon is eliminated. In addition, a key structural feature provides for the closed or back end of the integral electrical box being about even or flush with the interior flange so as to allow installation of the wall mounting assembly flush with the exterior surface of the side wall without having to cut or drill large openings in the wall to accommodate a protruding electrical box. These time saving features are significant in also eliminating the potential problem with having to cut through vertical supports or wall studs which if present can interfere with electrical boxes extending through the exterior wall.

It is also an object of the invention to provide for a wall mounting assembly with flanges capable of concealing edges of siding adjacently positioned. That is, the front wall and surrounding exterior flange member in combination with the interior flange of the assembly serve as an attractive finishing trim by providing a generally U-shaped channel running the entire perimeter of the device which allows for receiving and concealing siding edges.

It is yet a further principal object of the invention to provide a wall mounting assembly as previously described molded as an integral one-piece plastic unit.

Similarly, the present invention contemplates as still a further principal object a wall mounting assembly wherein the above device is fabricated into a two-piece unit. That is, a wall mounting assembly wherein the interior flange, inwardly indented axial wall, front wall and electrical box are molded as an integral one-piece first component. The exterior flange member is molded as an independent second component. The molded first component and the molded second component preferably have means for interengaging together. The exterior flange member of the two-piece unit may also comprise an integral laterally extending flange and an integral continuous axial wall adapted for telescoping over the molded first component to interconnect with the axial wall of the first component.

A still further object is to provide a wall mounting assembly wherein the electrical box includes at least one knock-out at the closed end adapted for removal for passage of electrical conductors into the box. Such boxes preferably include electrical device mounting means, such as threaded holes for receiving fasteners for supporting lighting fixtures, receptacles and outer trim plates.

A more specific version of the foregoing preferred embodiment contemplated consists of an integrally molded one-piece wall mounting assembly for electrical devices. This comprises an interior flange and a front wall with a wall flange surrounding the front wall. The wall flange and interior flange are spaced from one another by an inwardly indented axial wall positioned therebetween. This provides a generally U-shaped cross sectional channel encircling the assembly for receiving and concealing siding edges. The width of the U-shaped channel may be made available in varying sizes depending on the width of the lapped siding and insulation beneath the siding with both the siding and insulation fitting between the flanges for a more finished appearance. The front wall is molded with an integral electrical junction box with an open end and a closed end opposite the open end. The open end of the electrical junction box is integral with a central opening in the front wall for access to the interior of the electrical junction box. The closed end of the electrical junction box extends rearwardly towards the interior flange but not beyond the plane of the flange.

As previously mentioned in connection with the first described wall mounting assembly, the device may also be fabricated as a two-piece wall mounting assembly for electrical devices. Accordingly, the invention includes devices consisting of (i) a one-piece plastic body having a front wall and a continuous axial wall extending from the front wall and integral therewith. In addition, there is an integral continuous flange for attachment of the one-piece plastic body to a wall of a building, and an electrical box having an open end and a closed end opposite the open end. The open end of the electrical box is integral with an opening in the front wall for access to the interior of the electrical box. The closed end of the electrical box extends rearwardly towards the integral continuous flange without going beyond the plane of the flange.

(ii) In addition, there is a removable plastic flange member having an integral laterally extending flange and an integral continuous axial wall adapted to be telescoped over the axial wall of the one-piece plastic body (i).

(iii) The one-piece plastic body (i) and the removable plastic flange member (ii) have interengaging means for selectively positioning the removable plastic flange member (ii) at predetermined distances relative to the integral continuous flange of the one-piece plastic body (i). This permits adjusting the width of the generally U-shaped slot between the two flanges in accordance with the various thicknesses of the siding edges and insulation concealed therein.

It is a further object of the invention to provide a wall mounting assembly wherein the electrical junction box includes a plurality of side walls, each of the side walls being spaced from the inwardly indented axial walls. Optionally, the electrical junction box may be supported by one or more angular supporting ribs interposed between the electrical box and the inwardly indented axial wall.

It is a further object of the invention to provide an integral one-piece wall mounting assembly wherein the exterior flange member is thicker than the interior flange, and preferably, thicker in the direction of the interior flange. The exterior flange member is preferably of a thickness sufficient to provide a gap of predetermined width, narrower than customarily required, between the exterior flange member and the interior flange member. The predetermined gap width is determined prior to molding products of the invention and is based on the thickness of the building product to be accommodated. The predetermined gap width is preferably slightly greater than the thickness of the building product. For example, to accommodate standard siding of ¾" thickness, the gap width will be only slightly greater than ¾". This gap width allows the siding edges to be positioned between the flanges with a minimum of excess space between the siding and the flanges.

A more specific embodiment of the foregoing invention comprises: (i) A frame member having an interior flange suitable for mounting to a wall and an exterior flange member opposite the interior flange, the exterior flange member being thicker than the interior flange in the direction of the interior flange. The flanges are aligned in parallel planes and spaced from one another. (ii) A plurality of inwardly indented axial walls are positioned between the flanges to provide a generally u-shaped cross sectional channel encircling the assembly. (iii) A front wall with peripheral edges engages with the axial walls. (iv) An electrical box has an open end and a closed end opposite the open end. The open end of the electrical box is integral with a central opening in the front wall for access to the interior of the electrical box. The closed end of the electrical box extends rearwardly towards the interior flange but not beyond the plane of the interior flange.

As a preferred embodiment, the interior flange, exterior flange members, inwardly indented axial walls, front wall and electrical box of this embodiment are molded as an integral one piece unit.

In an alternate specific embodiment of the foregoing invention the exterior flange member can be of any thickness but includes an inwardly indented lip extending toward the interior flange. The lip creates a gap of pre-determined width between the lip and the interior flange. The lip may form any angle with the exterior flange member. The lip engages the siding/shingles/insulation, etc., against the interior flange to provide an attractive finished appearance.

In another specific embodiment of the foregoing invention the exterior flange member can be of any thickness but is positioned in a plane between the plane of the front wall and the plane of the interior flange. Thus, the position of the exterior flange member can provide a gap of predetermined width between the exterior flange member and the interior flange to accomodate siding/shingles/insulation of narrower width than that of the mounting assembly.

In each of the foregoing embodiments the interior flange forms an intersection It is a further object of the invention to provide an integral one-piece wall mounting assembly which includes scoring in an area proximate to the intersection to permit the interior flange to be separated from the wall mounting assembly to facilitate mounting of the assembly to a previously shingled/sided wall. with the inwardly indented axial walls.

BRIEF DESCRIPTION OF THE DRAWINGS

For a further understanding of the invention and its characterizing features reference should now be made to the accompanying drawings wherein.

DESCRIPTION OF THE PREFERRED EMBODIMENTS

Figures 1, 2:
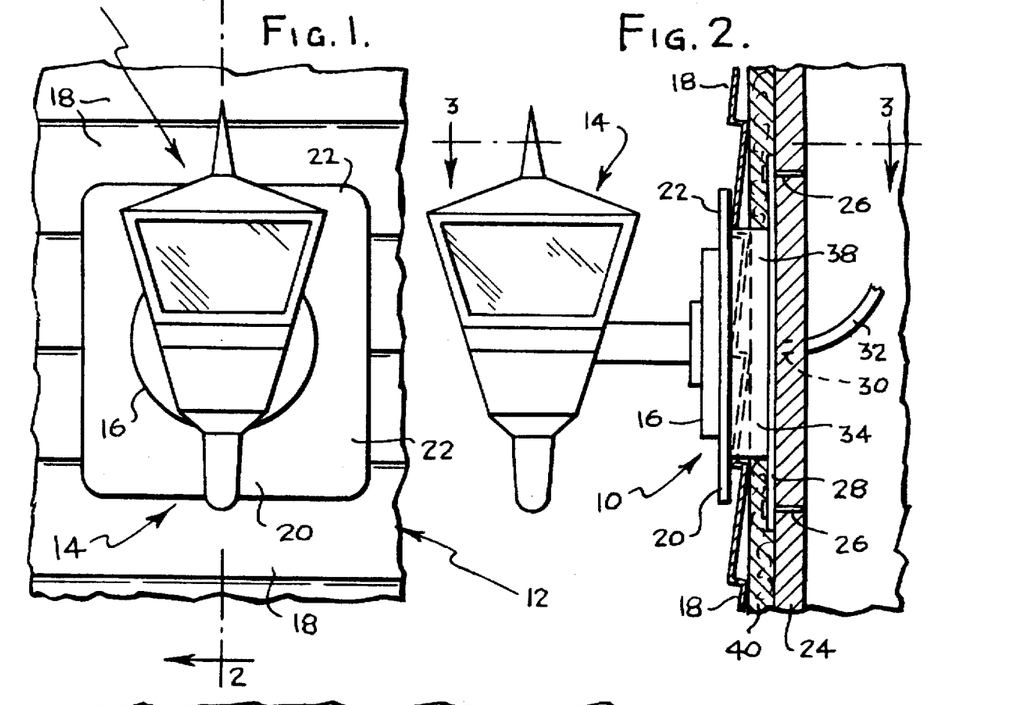
FIG. 1 is a front elevational view of the wall mounting assembly shown installed on a wall with a lighting fixture connected thereto.
FIG. 2 is a side sectional view of the wall mounting assembly shown installed on a wall with a lighting fixture connected taken along line 2—2 of FIG. 1.

Turning first to FIG. 1, there is shown the improved wall mounting assembly 10, preferably fabricated from plastics, such as high density polyethylene, poly-propylene, polystyrene, or other polymeric material suitable for injection molding. Mounting assembly 10 is illustrated in FIG. 1 after being completely installed on side wall 12 of a dwelling with lighting fixture 14 mounted through fixture mounting plate 16. Adjacent edges of lapped siding 18 are positioned under exterior flange member 20 of front wall 22 to provide an aesthetically attractive finished appearance.

Figure 3:
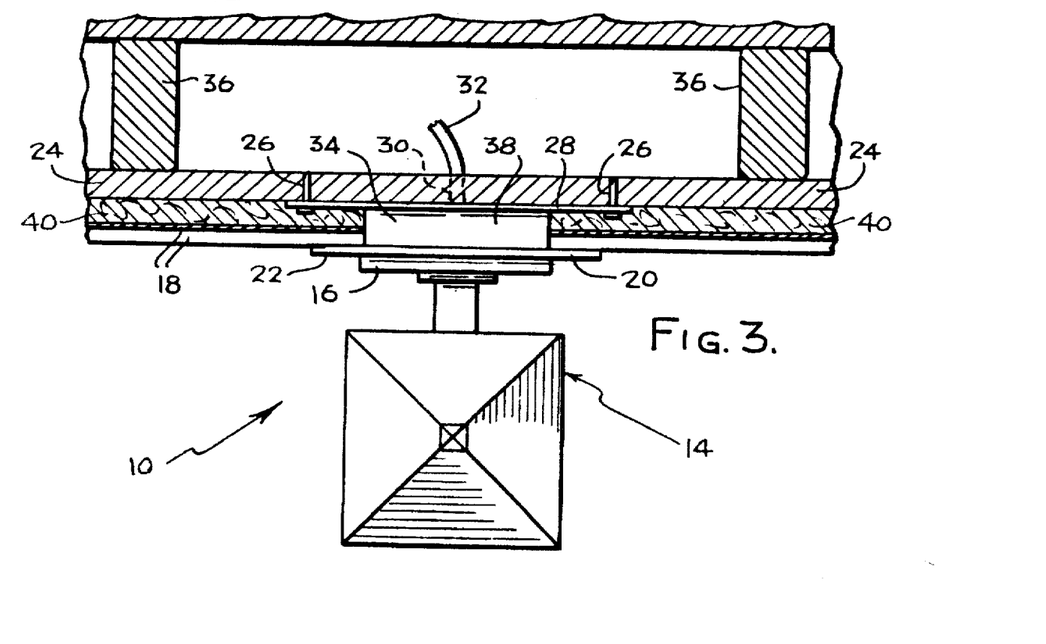
FIG. 3 is a top sectional view of the wall mounting assembly shown installed on a wall with a lighting fixture connected taken along line 3—3 of FIG. 2.

Wall mounting assembly 10, as best shown by FIGS. 2–3, is affixed to the exterior surface of framing plywood wall 24 by means of nail fasteners 26 driven through openings (not shown) in interior flange 28. A small diameter hole 30 drilled in framing plywood wall 24 permits electrical wire 32 to enter an opening in electrical junction box 34 (FIG. 2) for wiring lighting fixture 14. In this regard, it will be observed that mounting assembly 10 is affixed flush with the outer surface of framing plywood wall 24, and that no large openings need to be cut or drilled in the side wall of the dwelling to accommodate a protruding electrical junction box. Thus, wall mounting assembly 10 is also especially suitable for mounting immediately adjacent to vertical framing studs 36 without performing the inconvenient and time consuming task of making structural changes in the construction framing.

FIGS. 2–3 also illustrate inwardly indented axial wall 38 between interior flange 28 and exterior flange member 20 defining a generally U-shaped channel encircling the wall mounting assembly. The U-shaped channel receives the edges of both insulation boards 40 and the edges of lapped siding 18 hiding them to provide a tight weather seal and an attractive professionally finished appearance to the installation.

Figures 4, 5, 6, 7:
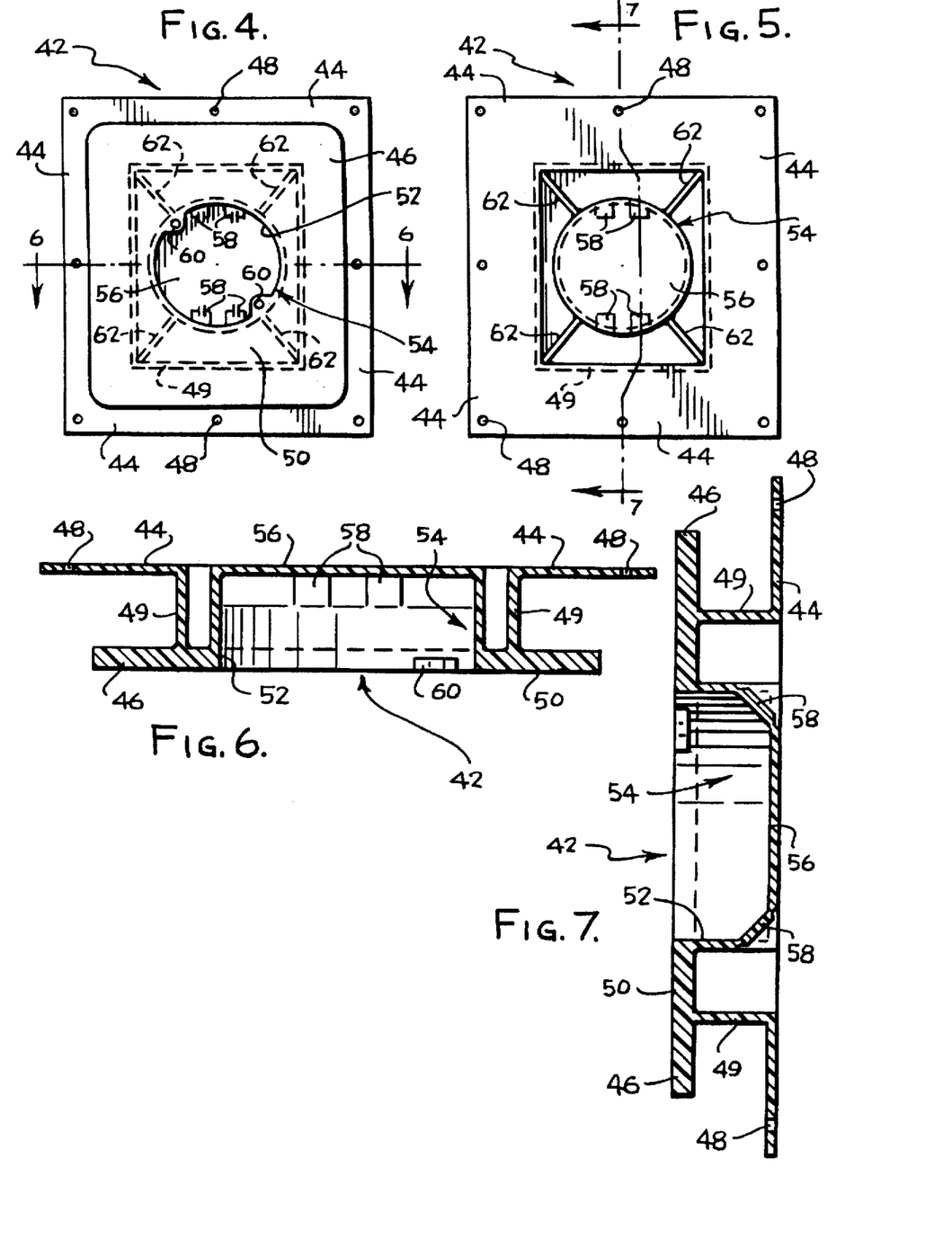
FIG. 4 is a front elevational view of an integral one-piece wall mounting assembly equipped with a cylindrically shaped electrical junction box.
FIG. 5 is a rear elevational view of the integral one-piece wall mounting assembly shown in FIG. 4.
FIG. 6 is a top sectional view of the integral one-piece wall mounting assembly taken along line 6—6 of FIG. 4.
FIG. 7 is a side sectional view of the integral one-piece wall mounting assembly taken along line 7—7 of FIG. 5.
Figure 8:
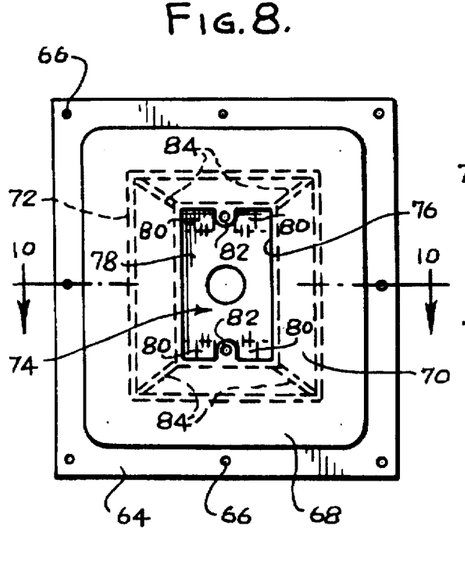
FIG. 8 is a front elevational view of an integral one-piece wall mounting assembly equipped with a rectangular shaped electrical junction box.
Figure 9:
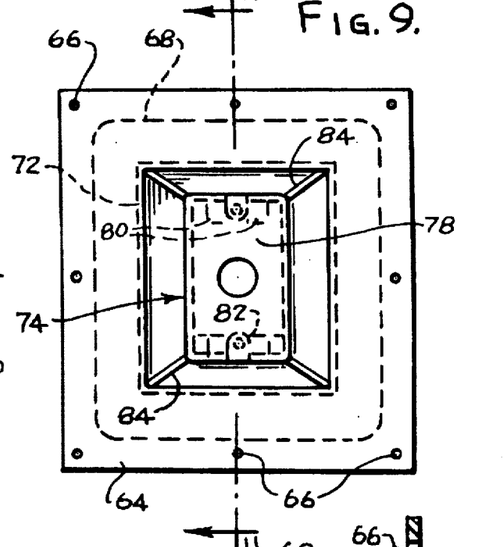
FIG. 9 is a rear elevational view of the one-piece wall mounting assembly shown in FIG. 8.
Figures 10, 11:
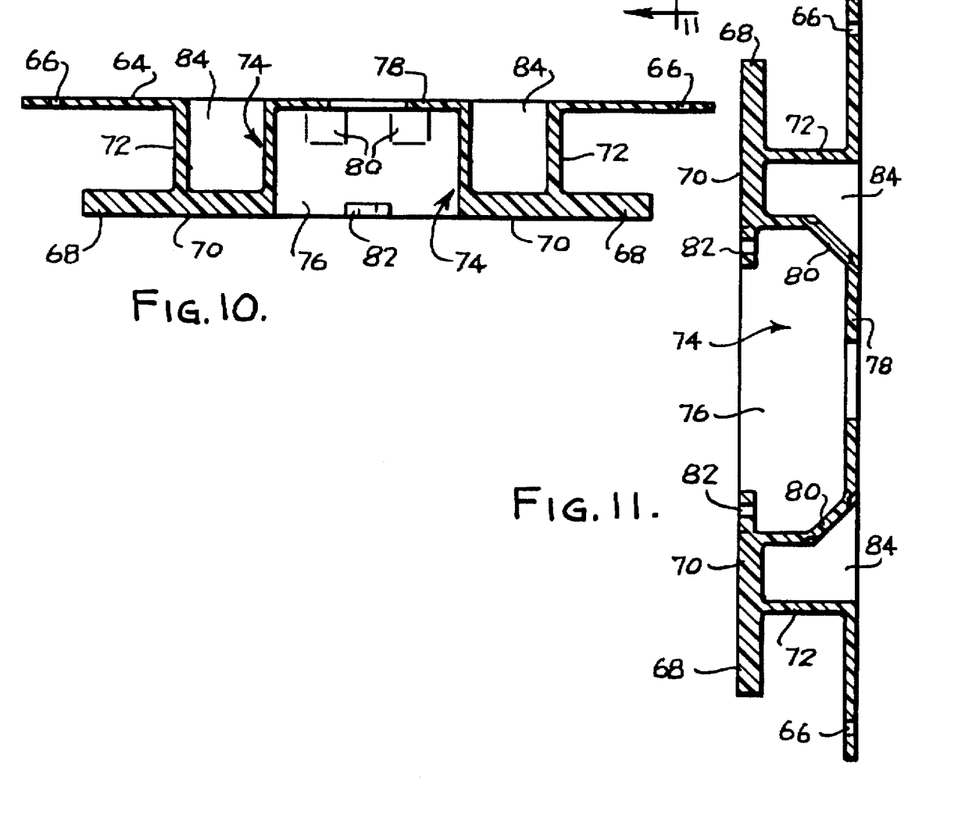
FIG. 10 is a top sectional view of the integral one-piece wall mounting assembly taken along line 10—10 of FIG. 8.
FIG. 11 is a side sectional view of the integral one-piece wall mounting assembly taken along line 11—11 of FIG. 9.

FIGS. 4–7 provide more detailed views of a one-piece molded wall mounting assembly 42 for electrical devices, such as lighting fixtures which utilize cylindrically shaped electrical wiring boxes. FIG. 4 illustrates the integral assembly with an interior flange 44 encircling the device. Dimensionally, interior flange 44 is larger than the exterior flange member 46 to readily enable affixing the device against the sidewall of a dwelling with suitable fasteners applied through interior flange openings 48. An inwardly indented axial wall 49 separates the exterior flange member 46 and the interior flange 44. The flanges and axial wall provide a generally U-shaped cross sectional channel for concealing insulation and siding edges (not shown). This embodiment contemplates channels of fixed dimensions to accommodate insulation and siding combinations of predetermined thicknesses. That is, the mounting devices will be prefabricated with channels of varying widths to accommodate common thicknesses of siding and insulation combinations.

Assembly 42 includes a front wall 50 which is shown as a panel having an exterior flange member 46. Front wall 50 consists of a supporting planar structure in the region between axial wall 49 and central opening 52. Opening 52 provides access to an electrical junction box 54 which is integral with front wall 50. Electrical junction box 54 is generally cylindrically shaped and open at the front wall 50 and closed at the rear wall 56. Rear wall 56 preferably has a plurality of knock-outs 58 adapted for removal to allow passage of an electrical conductor into the box for wiring an electrical device. In addition, electrical junction box 54 includes a plurality of threaded fixture supports 60 for securing a lighting fixture or other device to the mounting assembly. FIGS. 6–7 best illustrate the dept of junction box 54 as being flush with the plane of interior flange 44. It is to be understood that while junction box 54 is shown to be even with interior flange 44 the depth of the box may be shallower than illustrated. This allows the wall mounting assembly 42 to be conveniently flush mounted to the exterior surface of a side wall, for instance, without cutting or drilling a large opening or making structural alterations in vertical supporting studs in the wall which would otherwise be required for a protruding junction box. Finally, junction box 54 may also be reinforced by means of a plurality of angular supporting ribs 62 running between the cylindrical side wall of the box and axial wall 49.

FIGS. 8–11 also illustrate an integral one-piece molded wall mounting assembly of the invention for affixing and wiring electrical and communication devices through exterior walls having lapped siding/shingles. The particular embodiment of FIGS. 8–11 is especially useful in mounting and wiring devices, such as electrical outlets, switches, telephone receptacles and other communication equipment, like TV cables, etc. The assembly consists of an enlarged interior flange 64 with fastener openings 66 running the perimeter of the device. Axially spaced from interior flange 64 is exterior flange 68 which is a continuation of front wall 70. The interior and exterior flanges are spaced from one another by means of an inwardly indented axial wall 72, which although having one larger flange than the other nevertheless defines a slot having at least a partial U-shaped configuration. Front wall 70 includes a centrally positioned rectangular shaped electrical junction box 74 with an opening 76 for access to the interior, and a closed end 78 opposite the open end. Closed end 78 is shown extending rearwardly and is in alignment with interior flange 64. This permits flush mounting of the device to the exterior surface of a wall without cutting a large opening or altering vertical wall supporting studs which would otherwise be required for a protruding electrical box. Electrical junction box 74 also contains knock-outs 80 for removal during pre-wiring of the box, and threaded support members 82 at box opening 76 for securing the device being mounted therein. For added support, the integrally molded junction box 74 may have angular supporting ribs 84 extending from junction box side walls to inwardly indented axial wall 72.

Figure 12:
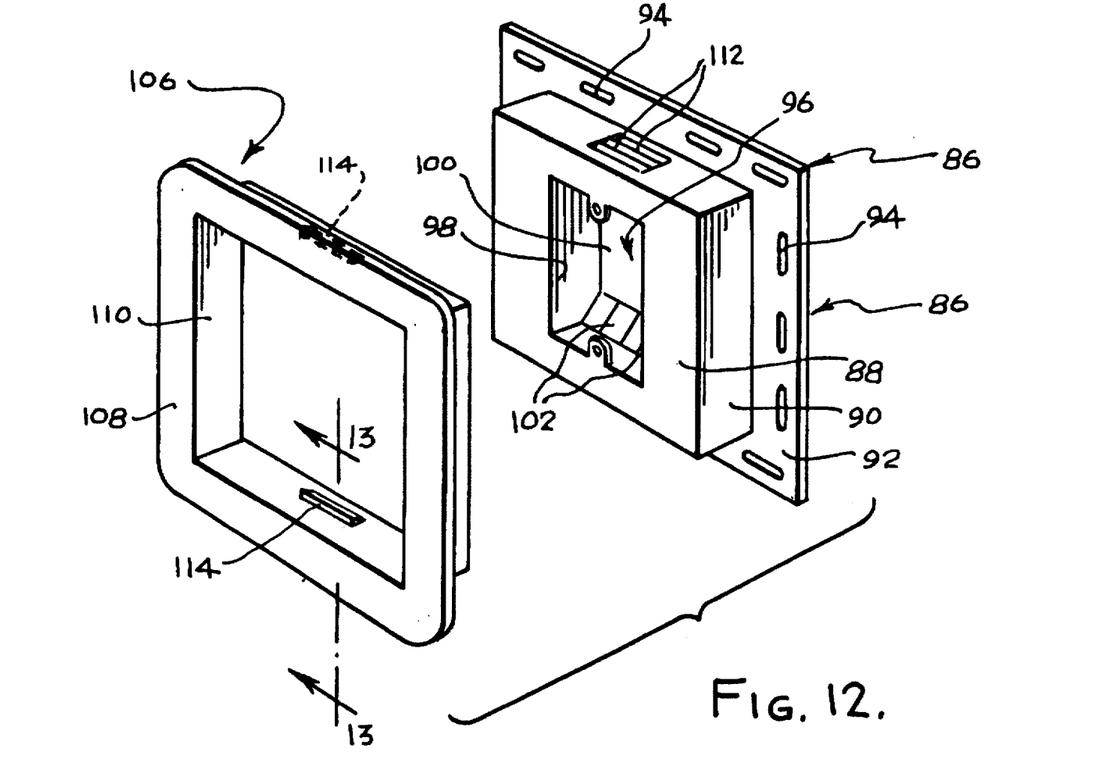
FIG. 12 is a exploded perspective view of an integral two-piece wall mounting assembly.
Figure 13:
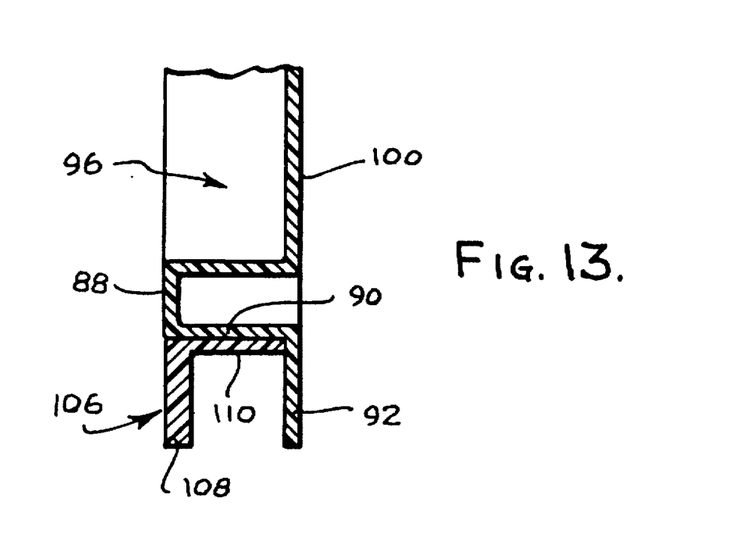
FIG. 13 is an partial sectional view of an assembled integral two-piece wall mounting assembly taken along line 13—13 of FIG. 12.

FIGS. 12–13 disclose a two piece version of the wall mounting device wherein the electrical junction box is also an integrally molded component and extends rearwardly without exceeding the plane of the interior flange. The wall mounting frame, i.e. without the integrally molded junction box of the present invention is disclosed in U.S. Pat. No. 4,920,708 (MacLeod et al), the contents of which are incorporated-by-reference herein. The particular device as illustrated by FIGS. 12–13 with a rectangular shaped junction box is useful in exterior wall mountings for electrical devices, such as switches, receptacles, etc. However, it is to be understood the wall mounting assembly of FIGS. 12–13 may also have a cylindrically shaped junction box particularly adapted for lighting fixtures and also molded integrally with the assembly. In either case, the device of FIGS. 12–13 is especially useful for side walls having lapped shingles or vinyl/aluminum siding in which the edges are hidden in a generally U-shaped slot defined by opposing flanges to provide an attractive finished appearance.

The device of FIG. 12 consists of an integral one-piece plastic wall component 86 adapted to be fastened to the outer surface of a wall, wherein the component comprises a planar front wall 88, an integral continuous axial wall 90 extending from the periphery of front wall 88 and an integral continuous flange 92 extending outwardly from the edge of axial wall 90. The peripheral edge of flange 92 has openings 94 for wall fasteners. An electrical junction box 96 integral with front wall 88 has an open end 98, a closed end 100 opposite the open end, knock-outs 102 at the closed end for removal during prewiring, and threaded supports 104 for securing an electrical outlet, switch, etc. in the junction box during wiring.

As illustrated by FIG. 13, closed end 100 of junction box 96 is a planar structure which is even with the plane of integral continuous flange 92. This embodiment also includes devices in which closed end 100 of junction box 96 extends rearwardly to a depth which is shallower than axial wall 90. That is, the depth of junction box 96 measured by the location of closed end 100 may be less than actually shown by FIG. 13. In either case, closed end 100 should not extend beyond the plane of flange 92. This permits flush mounting of the one piece molded component 86 without boring a large opening in the wall to receive a protruding junction box. Advantageously, the presence of vertical supporting studs in proximity to wall component 86 do not restrict location of the device. The second component of the two-piece version of the improved wall mounting assembly consists of a removable plastic flange unit 106 in the form of a molded integral peripheral frame suitable for telescoping over and interconnecting with one-piece molded component 86. Plastic flange member 106 consists of a laterally extending flange 108 and an integral continuous axial wall 110 extending from flange 108. When telescoped over the one-piece plastic wall unit 86 axial wall 110 slidably engages with continuous axial wall 90.

Continuous axial wall 90 of one-piece plastic wall component 86 includes axially spaced grooves 112 which are selectively engaged by axially spaced projections 114 on the inside surface of continuous axial wall 110 of removable plastic flange 106 when flange 106 is telescoped and moved axially towards wall component 86. Thus, after siding is applied against the side wall and siding edges are placed over integral continuous flange 92 removable plastic flange 106 is telescoped over axial wall 90 where projections 114 engage with one of spaced grooves 112, locking the plastic flange 106 in close engagement with the siding/insulation thereby holding the flange in proper adjusted position. The grooves 112 and projections 114 are preferably formed at diametrically opposed positions on their respective members.

Figure 14:
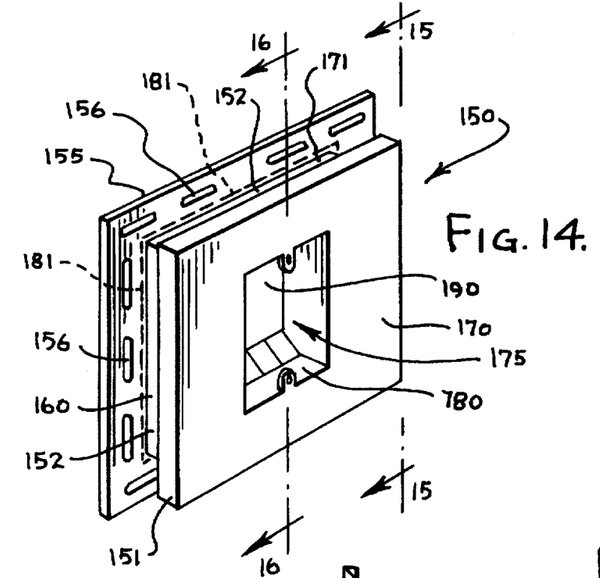
FIG. 14 is a front perspective view of an integral one-piece wall mounting assembly having a thickened exterior flange member.
Figure 15:
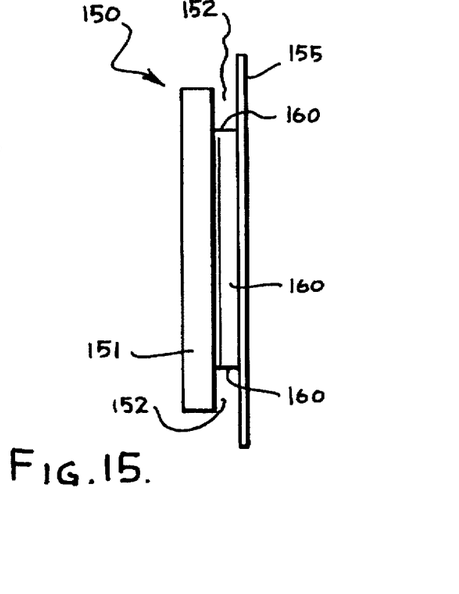
FIG. 15 is a side elevational view of the integral one-piece wall mounting assembly of FIG. 14 taken along line 15—15.
Figure 16:
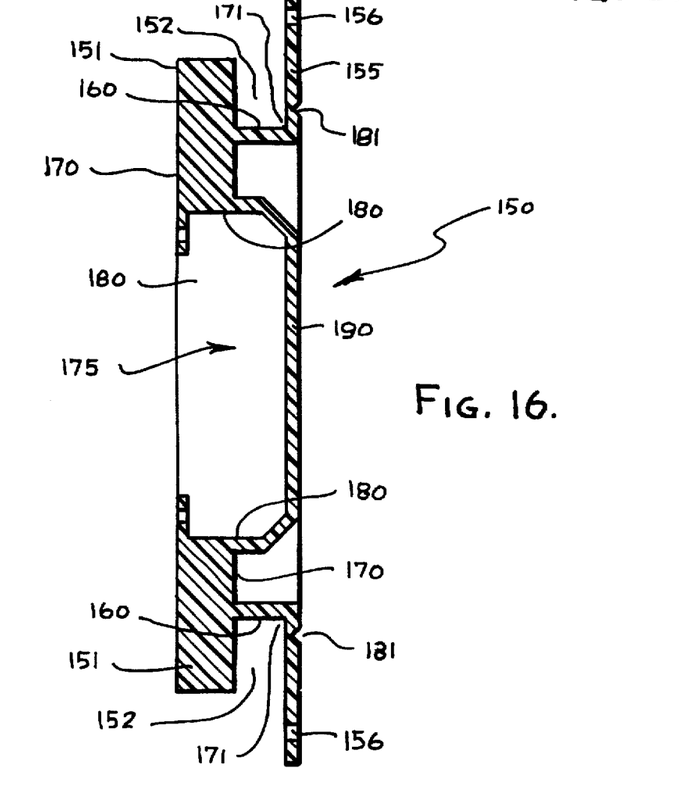
FIG. 16 is a side cut-away view of the integral one-piece wall mounting assembly of FIG. 14 taken along line 16—16.

FIGS. 14-16 disclose an integral one-piece molded wall mounting assembly 150 of the invention including an interior flange 155 and a front wall 170 surrounded by an exterior flange member 151. In the present embodiment exterior flange member 151 is thicker than interior flange 155, as best illustrated in FIGS. 15-16. That is to say, the relative breadth or depth of the exterior flange 151 to that of the interior flange 155 is greater in the direction of the interior flange. The breadth of the interior flange remains constant. This not only allows for a siding gap of reduced dimension, but does so without trade-offs in depth of the electrical junction box.

Inwardly indented axial walls 160 extend from exterior flange member 151 and intersect with interior flange 155 along line 171. Scoring 181 can be provided in the area of the intersection 171 of inwardly indented axial walls 160 and interior flange member 155, allowing interior flange 155 to be broken away from wall mounting assembly 150. This feature is advantageous when installing the assembly over an existing siding/insulation product. Openings can be cut into the siding/insulation corresponding to the dimensions of inwardly indented axial walls 160. Wall mounting assembly 150, without interior flange 155, can subsequently be positioned within the opening and affixed to a wall by means of threaded fasteners or the like extending through the closed end 190 of electrical box 175.

FIG. 14 shows wall mounting assembly 150 including openings 156 for affixing the device to a wall. Electrical box 175 is disposed within front wall 170 and is integral therewith. Electrical box 175 includes four side walls 180 (two shown), as representative example. It will be understood, however, the invention contemplates electrical junction boxes of any convenient geometrical design, including generally rounded, square shaped, octagonal, rectangular, etc. In one variation of the invention each of the side walls 180 of electrical box 175 are spaced from inwardly indented axial walls 160. One or more angular supporting ribs (not shown) may be interposed between electrical box 175 and inwardly indented axial wall 160 to provide further stability for the device.

Electrical box 175 must be of sufficient depth to allow ground fault interruption devices (GFIs), terminators, and the like to be placed therein. Further, electrical box 175 must provide sufficient space to allow the ends of electrical wires and cables to be worked conveniently by an electrician, and subsequently disposed entirely within electrical box 175. In addition, the total volume of electrical box 175 must be sufficient to meet safety specifications such as those required by Underwriters Laboratories: at least 12 cubic inches.

FIG. 15 shows interior flange 155 spaced from thicker exterior flange member 151. The edges of a building product (not shown) are to be positioned within narrowed gap 152, which may generally range from about 3/4 inches to about 7/8 inches.

FIG. 16 shows the closed end 190 of electrical box 175 extending as far as, but not past, the plane of interior flange 155. This feature avoids the necessity of cutting holes of significant dimension corresponding to the electrical junction box in the wall to which the wall mounting assembly 150 is attached.

In view of the above dimensional features of the electrical box 175, the outward projection of wall mounting assembly 150 from the wall to which it is attached will be at least equal to the depth of electrical box 175. Accordingly, front wall 170 will be spaced at least a distance equal to the depth of the electrical box 175 from interior flange 155. The greater thickness of exterior flange member 151 can provide a reduced gap between the inside surface of exterior flange member 151 and interior flange 155 to accomodate siding/shingles/insulation of narrower width than that of wall mounting assembly 150.

The width of gap 152 should be equal to or only slightly greater than the thickness of the building product to be accommodated by wall mounting assembly 150. Any greater gap width would result in excess spacing between the building product edges and flanges 151 and 155. Such excess spacing presents an unsightly appearance after installation of wall mounting assembly 150.

In order to achieve the desired predetermined gap, exterior flange member 151 must be thick enough to close the excess space between front wall 170 and interior flange 155.

FIG. 16 further illustrates inwardly indented axial side wall 160 intersecting with interior flange 155. As described above, interior flange 155 can include scoring 181 to allow interior flange 155 to be separated from the rest of wall mounting assembly 150.

Figure 17:
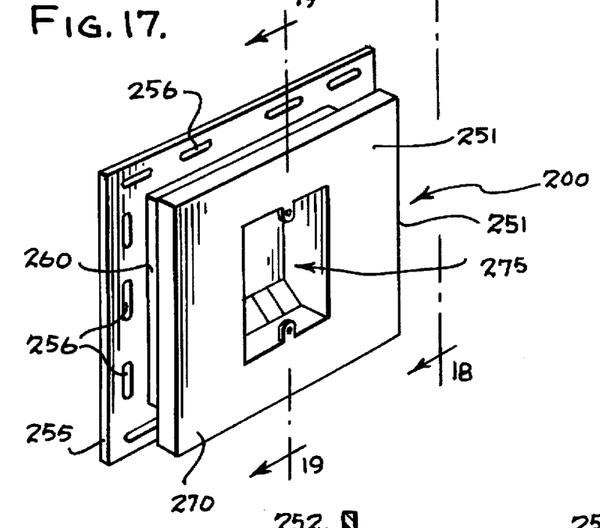
FIG. 17 is a front perspective view of an integral one-piece wall mounting assembly having an exterior flange member with a lip extending toward the interior flange.

FIGS. 17-20 disclose an alternative embodiment 200 of the invention wherein exterior flange member 251 may be of any desired thickness. FIG. 17 shows wall mounting system 200 including interior flange 255 having openings 256 for attaching the device to a wall. Also shown are front wall 270, exterior flange member 251 and electrical box 275.

Figures 19, 20:
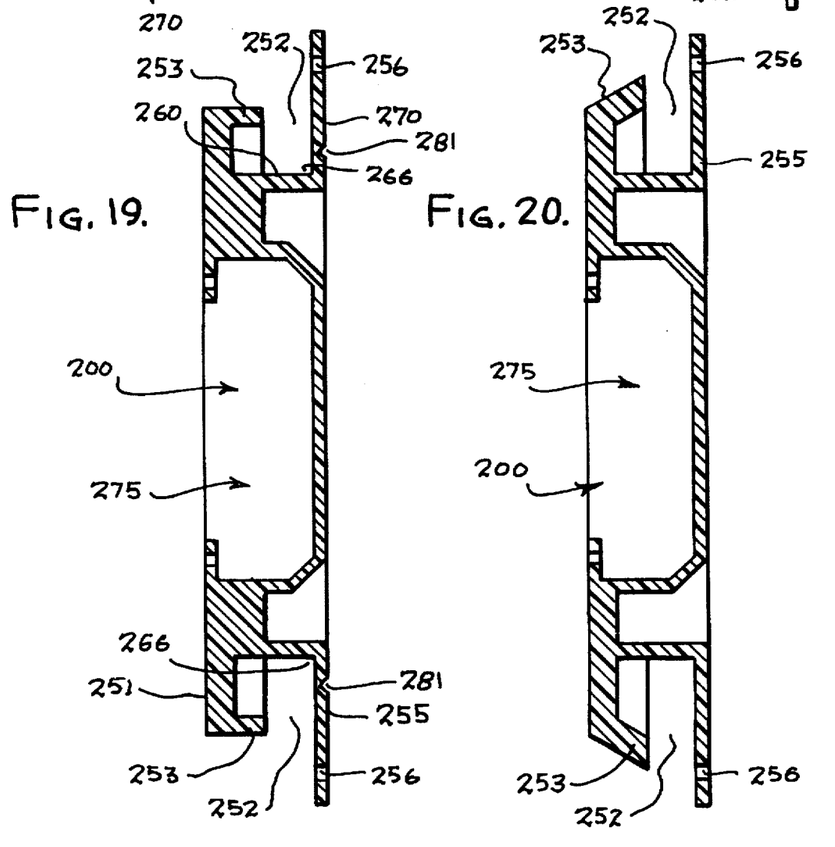
FIG. 19 is a side cut-away view of the integral one-piece wall mounting assembly of FIG. 17 taken along line 19—19, showing the lip at a 90° angle to the exterior flange member.
FIG. 20 is a side cut-away view of an alternate embodiment of the integral one-piece wall mounting assembly of FIG. 17 taken along line 19—19, having the lip at an obtuse angle to the exterior flange member.

FIG. 19 shows exterior flange member 251 including a lip 253 extending toward interior flange 255. Lip 253 is of sufficient length to create a gap 252 of pre-determined width, within which a building product (not shown) can be positioned. While the lip may form any angle with exterior flange member 251, the present embodiment includes lip 253 forming a right angle with exterior flange member 251.

Figure 18:
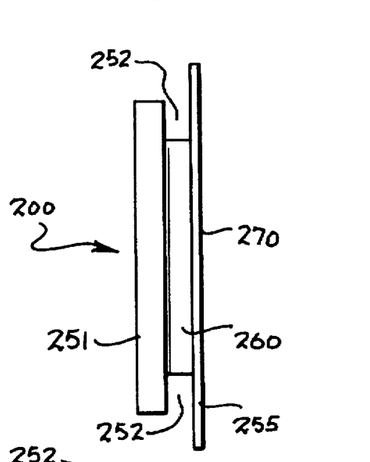
FIG. 18 is a side elevational view of the integral one-piece wall mounting assembly of FIG. 17 taken along line 18—18.

FIG. 18 is a side view showing lip 253 extending over inwardly indented axial wall 260 and toward interior flange 255. Inwardly indented axial wall 260 intersects with interior flange 255 at intersection 266. Scoring may be provided in the area of intersection 266 so that interior flange 255 can be separated from the rest of wall mounting system 200, as in the previous embodiment.

FIG. 20 shows an alternate embodiment of wall mounting system 200 wherein lip 253 forms an obtuse angle with exterior flange member 251.

Figure 21:
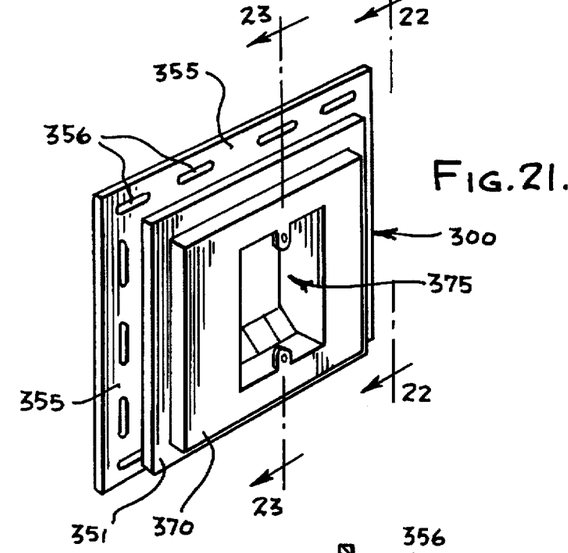
FIG. 21 is a front prospective view of an integral one-piece wall mounting assembly having an exterior flange member spaced inwardly from the front wall of the assembly.
Figure 22:
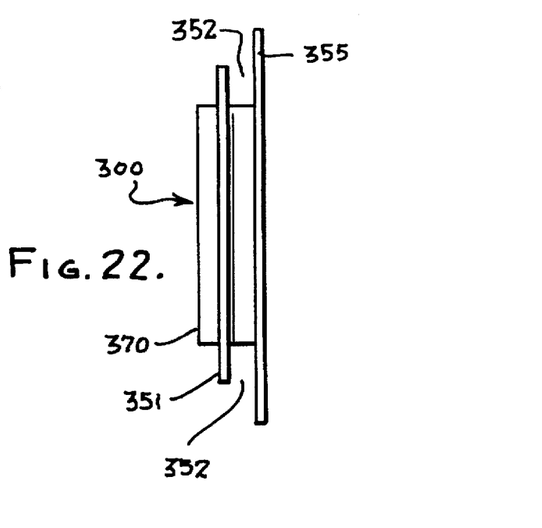
FIG. 22 is a side elevational view of the integral one-piece wall mounting assembly of FIG. 21 taken along line 22—22.
Figure 23:
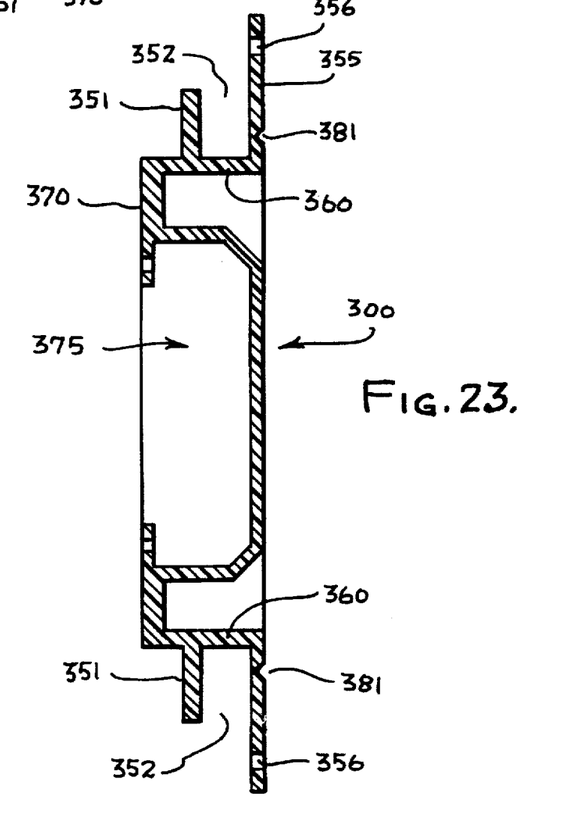
FIG. 23 is a side cut-away view of the integral one-piece wall mounting assembly of FIG. 21 taken along line 23—23.

Turning to FIGS. 21–23 there is shown another embodiment of the invention. FIG. 21 shows wall mounting system 300 including interior flange 355 having openings 356 for attaching the device to a wall. Also shown is front wall 370, electrical box 375 and exterior flange member 351. In this embodiment exterior flange member 351 is positioned in a plane between the plane of front wall 370 and the plane of interior flange 355.

FIG. 22 is a side view showing a gap 352 between exterior flange member 351 and interior flange 355. Exterior flange member 351 is preferably positioned such that gap 352 is of the appropriate predetermined width.

FIG. 23 shows exterior flange member 351, interior flange 355, and gap 352 in relation to electrical box 375. Inwardly indented axial wall 360 intersects perpendicularly with interior flange 355. As in previous embodiments, scoring lines 381 may be positioned in the area of this intersection. Thus, interior flange 355 may be broken away, or otherwise separated, from wall mounting system 300. Existing siding products may be cut to the dimensions of inwardly indented axial side walls 360. Wall mounting system 300 can then be inserted into the pre-cut siding product, and affixed to the supporting wall structure by means of threaded fasteners applied through the rear wall of electrical junction box 375.

While the invention has been described in conjunction with various embodiments, they are illustrative only. Accordingly, many alternatives, modifications and variations will be apparent to persons skilled in the art in light of the foregoing detailed description. The foregoing description is intended to embrace all such alternatives and variations falling within the spirit and broad scope of the appended claims.

We claim:

1. An integral one-piece molded wall mounting assembly comprising a frame member having an interior flange suitable for mounting to a wall; an exterior flange member opposite said interior flange, said exterior flange member being thicker than said interior flange in the direction of the interior flange; said flanges being aligned in parallel planes and spaced from one another; inwardly indented axial walls positioned between said flanges to provide a channel encircling said assembly; a front wall surrounded by said exterior flange member, and an electrical box having an open end and a closed end opposite said open end, the open end of said electrical box being integral with a central opening in said front wall for access to the interior of said electrical box.

2. The wall mounting assembly of claim 1 wherein said closed end of said electrical box extends rearwardly towards said interior flange so it is substantially even with the plane of said flange.

3. The wall mounting assembly of claim 1 wherein said exterior flange member is spaced at a predetermined distance from said interior flange.

4. The wall mounting assembly of claim 1 wherein said electrical box has a volume of at least about 12 cubic inches.

5. The wall mounting assembly of claim 1 wherein said interior flange forms an intersection with said inwardly indented axial walls, said wall mounting assembly including scoring in the area of said intersection to allow said interior flange to be separated from said wall mounting assembly.

6. The wall mounting assembly of claim 1 wherein said electrical box includes one or more adjoining side walls.

7. A wall mounting assembly comprising a frame member having an interior flange suitable for mounting to a wall; an exterior flange member opposite said interior flange, said exterior flange member having an inwardly indented lip extending generally toward said interior flange to provide a gap between said lip and said interior flange which is narrower than a gap between said interior flange and said exterior flange member; said flanges being aligned in parallel planes and spaced from one another; inwardly indented axial walls positioned between said flanges to provide a channel encircling said assembly; a front wall surrounded by said exterior flange member, and an electrical box having an open end and a closed end opposite said open end, the open end of said electrical box being integral with a central opening in said front wall for access to the interior of said electrical box, the closed end of said electrical box extending rearwardly towards said interior flange but not beyond the plane of said flange.

8. The wall mounting assembly of claim 7 wherein said lip forms an angle of at least about a 90° with said exterior flange member.

9. The wall mounting assembly of claim 7 wherein said inwardly indented lip creates a gap of predetermined distance between said inwardly indented lip and said interior flange.

10. The wall mounting assembly of claim 7 wherein said electrical box includes one or more adjoining side walls, each of said one or more side walls being spaced from said inwardly indented axial wall.

11. The wall mounting assembly of claim 7 wherein said electrical box has a volume of at least about 12 cubic inches.

12. A wall mounting assembly comprising a frame member having an interior flange suitable for mounting to a wall; an exterior flange member opposite said interior flange; said flanges being aligned in parallel planes and spaced from one another; inwardly indented axial walls positioned between said flanges to provide a channel encircling said assembly; a front wall having peripheral edges in engagement with said inwardly indented axial walls; said exterior flange member offset in a plane between the plane of said front wall and the plane of said interior flange; and an electrical box heaving an open end and a closed end opposite said open end, said open end of said electrical box being integral with a central opening in said front wall for access to the interior of said electrical box.

13. The wall mounting assembly of claim 12 wherein said closed end of said electrical box extends rearwardly towards said interior flange so it is substantially even with the plane of said interior flange.

14. The wall mounting assembly of claim 12 wherein said assembly is an integral one-piece molded unit.

15. The wall mounting assembly of claim 12 wherein said electrical box includes one or more adjoining side walls, each of said one or more side walls being spaced from said inwardly indented axial walls.

16. The wall mounting assembly of claim 12 wherein said interior flange forms an intersection with said inwardly indented side wall, said mounting assembly including scoring in the area of said intersection to allow said interior flange to be separated from said wall mounting assembly.

17. The wall mounting assembly of claim 12 wherein said electrical box has a volume of at least about 12 cubic inches.

18. An integral one-piece wall mounting assembly comprising:

a frame member having an interior flange suitable for mounting to a wall;

an exterior flange member opposite said interior flange, said exterior flange member being thicker than said interior flange in the direction of the interior flange;

said flanges being aligned in parallel planes and spaced from one another;

an inwardly indented axial wall positioned between said flanges to provide a generally U-shaped cross sectional channel encircling said assembly, said interior flange forming an intersection with said inwardly indented axial wall, said one-piece wall mounting assembly including scoring in the area of said intersection to allow said interior flange to be separated from said wall mounting assembly;

a front wall surrounded by said exterior flange member;

an electrical box having an open end and a closed end opposite said open end, and the open end of said electrical box being integral with a central opening in said front wall for access to the interior of said electrical box.

19. An integral one-piece wall mounting assembly comprising:

a frame member having an interior flange suitable for mounting to a wall;

an exterior flange member opposite said interior flange, said exterior flange member having an inwardly indented lip extending generally toward the plane of said said interior flange at an obtuse angle with said exterior flange member;

said flanges being aligned in parallel planes and spaced from one another;

an inwardly indented axial wall positioned between said flanges to provide a generally U-shaped cross sectional channel encircling said assembly;

a front wall surrounded by said exterior flange member;

an electrical box having an open end and a closed end opposite said open end, and the open end of said electrical box being integral with a central opening in said front wall for access to the interior of said electrical box.

20. An integral one-piece wall mounting assembly comprising:

a frame member having an interior flange suitable for mounting to a wall;

an exterior flange member opposite said interior flange, said exterior flange member having an inwardly indented lip extending generally toward the plane of said interior flange;

said flanges being aligned in parallel planes and spaced from one another;

an inwardly indented axial wall positioned between said flanges to provide a generally U-shaped cross sectional channel encircling said assembly, said interior flange forming an intersection with said inwardly indented side wall, said one-piece wall mounting assembly including scoring in the area of said intersection to allow said interior flange to be separated from said wall mounting assembly;

a front wall surrounded by said exterior flange member;

an electrical box having an open end and a closed end opposite said open end, and the open end of said electrical box being integral with a central opening in said front wall for access to the interior of said electrical box.

21. An integral one piece molded wall mounting assembly comprising a frame member having an interior flange suitable for mounting to a wall; an exterior flange member opposite said interior flange, said exterior flange member having an inwardly indented lip extending generally toward said interior flange to provide a gap between said lip and said interior flange which is narrower than a gap between said interior flange and said exterior flange member; said flanges being aligned in parallel planes and spaced from one another; inwardly indented axial walls positioned between said flanges to provide a channel encircling said assembly; a front wall surrounded by said exterior flange member, and an electrical box having an open end and a closed end opposite said open end, the open end of said electrical box being integral with a central opening in said front wall for access to the interior of said electrical box.

22. A wall mounting assembly comprising a frame member having an interior flange suitable for mounting to a wall; an exterior flange member opposite said interior flange, said exterior flange member having an inwardly indented lip extending generally toward said interior flange at an obtuse angle with said exterior flange member to provide a gap between said lip and said interior flange which is narrower than a gap between said interior flange and said exterior flange member; said flanges being aligned in parallel planes and spaced from one another; inwardly indented axial walls positioned between said flanges to provide a channel encircling said assembly; a front wall surrounded by said exterior flange member, and an electrical box having an open end and a closed end opposite said open end, the open end of said electrical box being integral with a central opening in said front wall for access to the interior of said electrical box.

23. A wall mounting assembly comprising a frame member having an interior flange suitable for mounting to a wall; an exterior flange member opposite said interior flange, said exterior flange member having an inwardly indented lip extending generally toward said interior flange to provide a gap between said lip and said interior flange which is narrower than a gap between said interior flange and said exterior flange member; said flanges being aligned in parallel planes and spaced from one another; inwardly indented axial walls positioned between said flanges to provide a channel encircling said assembly; a front wall surrounded by said exterior flange member, an electrical box having an open end and a closed end opposite said open end, the open end of said electrical box being integral with a central opening in said front wall for access to the interior of said electrical box, and wherein said interior flange forms an intersection with said inwardly indented axial side walls, said mounting assembly including scoring in the area of said intersection to allow said interior flange to be separated from said wall mounting assembly.

* * * * *